United States Patent
de la Cropte de Chanterac et al.

(10) Patent No.: US 11,556,915 B2
(45) Date of Patent: Jan. 17, 2023

(54) LOW POWER MODE FOR PAYMENT TRANSACTIONS

(71) Applicant: Apple Inc., Cupertino, CA (US)

(72) Inventors: Cyril de la Cropte de Chanterac, San Francisco, CA (US); Joseph Hakim, Boulder Creek, CA (US); Leland W. Lew, Los Altos, CA (US); Hue Duc Tran, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 723 days.

(21) Appl. No.: 16/228,004

(22) Filed: Dec. 20, 2018

(65) Prior Publication Data

US 2019/0266593 A1 Aug. 29, 2019

Related U.S. Application Data

(63) Continuation of application No. 14/500,927, filed on Sep. 29, 2014, now Pat. No. 10,198,726, which is a
(Continued)

(51) Int. Cl.
*G06Q 20/32* (2012.01)
*H04W 52/02* (2009.01)
(Continued)

(52) U.S. Cl.
CPC ......... *G06Q 20/3278* (2013.01); *G06Q 20/36* (2013.01); *G07F 7/0873* (2013.01); *H04W 52/0277* (2013.01); *Y02D 30/70* (2020.08)

(58) Field of Classification Search
CPC .......................... G06Q 20/36; H04W 52/0283
(Continued)

(56) References Cited

U.S. PATENT DOCUMENTS

| 7,912,441 B2 | 3/2011 | Von Bosch |
| 8,282,009 B2 | 10/2012 | Ahn et al. |

(Continued)

FOREIGN PATENT DOCUMENTS

| CN | 102455823 | 5/2012 |
| CN | 102725779 | 10/2012 |

OTHER PUBLICATIONS

German Office Action from German Patent Application No. 112014003625.0, dated Dec. 1, 2020, 10 pages including English language summary.
(Continued)

*Primary Examiner* — Cho Kwong
(74) *Attorney, Agent, or Firm* — BakerHostetler

(57) ABSTRACT

This application relates to systems, methods, and apparatus for using a computing device to perform payment transactions while the computing device is operating in a low power wallet mode during a low battery state of the computing device. During a low power wallet mode, various subsystems are prevented from receiving current from a battery of the computing device, while a near field communication (NFC) system of the computing device is provided with an operating current for detecting target systems. A target system and the NFC system can communicate during the low power wallet mode of the computing device, thereby allowing a user of the computing device to conduct payment transactions when the computing device is in a low power wallet mode. Such payment transactions can be useful if the user is ever stranded without enough power to fully operate the computing device and needs to pay for transportation.

20 Claims, 13 Drawing Sheets

Related U.S. Application Data continuation-in-part of application No. 14/063,433, filed on Oct. 25, 2013, now Pat. No. 9,603,090.

(60) Provisional application No. 62/005,249, filed on May 30, 2014, provisional application No. 61/863,549, filed on Aug. 8, 2013.

(51) Int. Cl.
*G07F 7/08* (2006.01)
*G06Q 20/36* (2012.01)

(58) Field of Classification Search
USPC .......................................................... 705/41
See application file for complete search history.

(56) References Cited

U.S. PATENT DOCUMENTS

| | | | |
|---|---|---|---|
| 8,639,291 B1* | 1/2014 | Gailloux | H04W 52/0274 |
| | | | 455/558 |
| 2009/0291634 A1 | 11/2009 | Saarisalo | |
| 2009/0307139 A1* | 12/2009 | Mardikar | G06Q 20/382 |
| | | | 705/67 |
| 2010/0317408 A1 | 12/2010 | Ferren et al. | |
| 2010/0332392 A1 | 12/2010 | Ueno et al. | |
| 2011/0313922 A1 | 1/2011 | Ben Ayed | |
| 2011/0215921 A1 | 9/2011 | Ben Ayed et al. | |
| 2011/0282785 A1 | 11/2011 | Chin | |
| 2012/0202423 A1 | 8/2012 | Tiedemann | |
| 2012/0238206 A1 | 9/2012 | Singh et al. | |
| 2012/0260119 A1 | 10/2012 | Garnier et al. | |
| 2013/0007473 A1 | 1/2013 | van der Lee | |
| 2013/0040563 A1 | 2/2013 | Kim | |
| 2013/0084803 A1 | 4/2013 | Hall et al. | |
| 2013/0109443 A1 | 5/2013 | Eaton et al. | |
| 2013/0196594 A1 | 8/2013 | Moosavi | |
| 2013/0203347 A1 | 8/2013 | Moosavi | |
| 2013/0226792 A1 | 8/2013 | Kushevsky et al. | |
| 2013/0300687 A1 | 11/2013 | Park | |
| 2013/0332354 A1 | 12/2013 | Rhee et al. | |
| 2014/0040120 A1* | 2/2014 | Cho | G06Q 20/3278 |
| | | | 705/39 |
| 2014/0203988 A1 | 7/2014 | Yang | |
| 2014/0298434 A1 | 10/2014 | Prchal | |
| 2014/0302785 A1 | 10/2014 | Arora et al. | |
| 2015/0019892 A1 | 1/2015 | Agrawal | |

OTHER PUBLICATIONS

Chinese Office Action from Chinese Patent Application No. 201811090548.4, dated Jul. 20, 2021, 24 pages including English language translation.

* cited by examiner

LOW POWER MODE FOR PAYMENT TRANSACTIONS

CROSS-REFERENCE TO RELATED APPLICATIONS

This application is a continuation of U.S. application Ser. No. 14/500,927 filed Sep. 29, 2014, which is a continuation-in-part of U.S. application Ser. No. 14/063,433 filed Oct. 25, 2013, (now U.S. Pat. No. 9,603,090), which claims the benefit of U.S. Provisional Patent Application No. 61/863,549, filed Aug. 8, 2013, the contents of which are incorporated herein by reference in their entirety for all purposes.

This application claims the benefit of U.S. Provisional Application No. 62/005,249, entitled "LOW POWER MODE FOR PAYMENT TRANSACTIONS" filed May 30, 2014, the content of which is incorporated herein by reference in its entirety for all purposes.

FIELD

The described embodiments relate generally to conducting payment transactions using a computing device. More particularly, the present embodiments relate to conducting payment transactions when a battery of the computing device is in a low charge state.

BACKGROUND

During mobile device usage and subsequent battery discharge to a low battery state, a mobile device is typically designed to shutdown with some excess remaining energy, in order to ensure there is enough battery energy to efficiently handle expected dynamic peak load surges required by various mobile applications. In many designs the excess remaining energy can provide faster startup for the mobile device once the mobile device has received additional charge. Often times, the user is unable to charge their mobile device during a particular excursion, not necessarily due to lack of warning, but occasionally due to lack of planning, or lack of proximity or access to a charging source. If the user is left stranded at a particular point in the excursion with their mobile device in a low battery or shutdown state, they may be severely inconvenienced. Moreover, even if the user could harvest the remaining energy in the battery, the mobile device is likely not designed to appropriately use the remaining energy to improve the situation of the user. By designing a power system for a mobile device that can adaptively and effectively harvest the remaining energy in the battery, the manufacturer of the mobile device can advantageously create an opportunity to help a stranded user when the user might appreciate such assistance the most.

SUMMARY

This paper describes various embodiments that relate to operating a near field communication system in a low power mode or low power wallet mode during a low battery state of a computing device. In some embodiments, a method for operating a payment system of a computing device in a low power wallet mode is set forth. The method can include a step of determining that a charge of a battery of the computing device is at or below a predetermined threshold. The method can further include the steps of preventing multiple subsystems of the computing device from receiving power and providing a first power signal to a field detector of a near-field communication (NFC) system of the computing device. Additionally, when the field detector indicates that a target system is at an operable distance from the field detector, the method includes a step of causing the near-field communication system to provide an initiation signal to a power management system. In response, the power management system can cause a second power signal, which is greater than the first power signal, to be supplied to the field detector during a predetermined duty cycle.

In other embodiments, a system for performing a payment transaction is set forth. The system can include a central processing unit (CPU), multiple subsystems operatively coupled to the CPU, and a near field communication (NFC) device operatively coupled to the CPU. Additionally, the system can include a power management unit (PMU) operatively coupled to the CPU, and a battery operatively coupled to the PMU. When a charge of the battery is at or below a wallet mode threshold, the multiple subsystems can be prevented from receiving a current from the battery, and the NFC device is provided with a field operating current in order to operate a field detector of the NFC device.

In yet other embodiments, a cellular device is set forth. The cellular device can include a network antenna, a near field communication (NFC) system, and a central processing unit (CPU) operatively coupled to the NFC system. The cellular device can further include a battery configured to provide current to the network antenna, CPU, and NFC system. When a charge of the battery is at or below a wallet mode threshold or charge threshold, the network antenna can be prevented from receiving current from the battery, and the NFC system can be provided a field operating current for detecting a target system.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
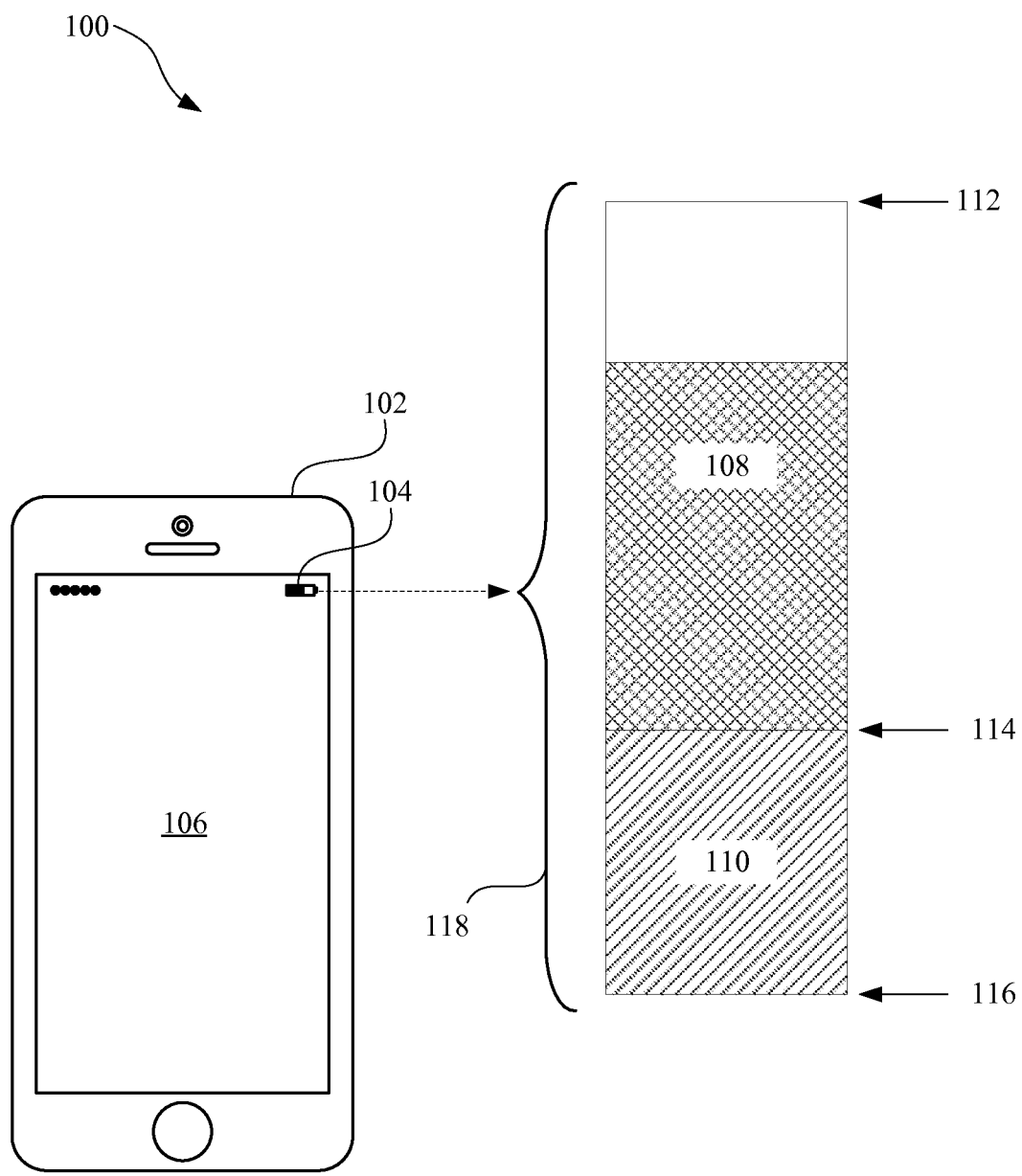
FIG. 1 illustrates a diagram of a mobile device and a battery chart detailing different battery state-of-charge thresholds.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments set forth herein relate to conducting payment transactions using a computing device that is operating in a low power wallet mode. The computing device can include a near field communication (NFC) system for conducting contactless payment transactions between computing device and a target system associated with another party to the payment transaction. A portion of the battery capacity can be reserved for conducting payment transactions when the battery has transitioned from a normal operating mode to a low power wallet mode. In this way, even when the computing device indicates that the battery does not have enough charge to perform the normal functions of the computing device, such as placing phone calls or browsing the internet, the computing device can still perform payment transactions. This is beneficial to a user who may be physically stranded at a particular point in time, and needs to make a payment transaction in order to pay for a ride home. The computing device can include stored accounts or cards that are emulated by the NFC system so that the target system can associate the computing device with a user account (i.e., the source of a payment) even when the computing device is operating at in a low power wallet mode.

The computing device can include multiple operating modes such as the normal mode, low power mode (also referred to as low power wallet mode, or wallet mode), and a battery off mode. A particular voltage threshold can define each mode. For example, in some embodiments the normal mode is within 4.3 and 3.4 volts, the low power wallet mode can be between 3.4 and 3.1 volts, and the battery off mode can be below 3.1 volts. These values can be modified to any suitable voltage value for defining similar modes. When the voltage of the battery falls within the range of the low power wallet mode, various subsystems of the computing device can be shut down while concurrently providing a current to a field detector of the NFC system. In this way, the NFC system can still be used for conducting multiple payment transactions during the low power wallet mode, however, the computing device would not be able to perform normal functions (e.g., place phone calls). When the NFC system detects a target system having a particular energy level, or the user presses a designated button for initiating operations of the computing device, the NFC system and other subsystems can receive current from the battery in order to perform various operations related to payment transactions. For example, a user interface and a fingerprint scanner of the computing device can be provided current from the battery in order to validate payment transactions. A user can either press their finger to the fingerprint scanner to validate a payment transaction, type a passcode into the user interface to validate a payment transaction, or perform any other suitable validation procedure using a particular subsystem, as further discussed herein.

During the payment transactions, a duty cycle and peak voltage level of the payment transaction can be managed by the computing device. The duty cycle can be limited such that payment transactions are brief, thus saving energy and conserving battery charge. The peak voltage level can be limited such that spikes in voltage do not occur during the payment transactions, further conserving battery charge and allowing multiple payment transactions to occur at a lower operating threshold.

These and other embodiments are discussed below with reference to FIGS. 1-13B; however, those skilled in the art will readily appreciate that the detailed description given herein with respect to these figures is for explanatory purposes only and should not be construed as limiting.

FIG. 1 illustrates a diagram 100 of a mobile device 102 having a battery status indicator 104 included at a user interface 106 of the mobile device 102. Specifically, FIG. 1 illustrates how different operating modes of the mobile device 102 are enabled based on the amount of energy that is remaining in the battery. The battery status indicator 104 is an interpretation of the energy left in the battery. The actual energy left in the battery can be represented in the battery chart 118, which details the various levels and thresholds that the mobile device 102 incorporates into the operation of the mobile device 102. The battery chart 118 can include a maximum charge level 112, which can be a level of charge when the battery is at a full capacity. The operating charge level 108 can indicate the amount of battery charge that is available for a normal operating mode of the mobile device 102. The normal operating mode can allow the mobile device 102 to perform functions such as place phone calls, connect to Wi-Fi, play media files, and any other suitable function normal to a mobile computing device. A normal off threshold 114 is provided in order to limit the current output of the battery once the battery charge has dropped to or below the normal off threshold 114. Upon the battery charge decreasing to the normal off threshold 114, the mobile device 102 can transition from a normal mode to a normal off mode. While in the normal off mode, the mobile device 102 can be configured to require an external power supply to assist the mobile device 102 in harvesting power when starting up again. The charge remaining during the normal off mode is the normal off charge level 110. Should the normal off charge level 110 fall to a under-voltage lockout threshold 116, the mobile device 102 may not be able to start up or power up in a way that provides full functionality of the mobile device 102 without an external power supply. Moreover, if the normal off threshold 114 is set too low, or is the only provided threshold for limiting power, the mobile device 102 may not be able to provide necessary or emergency-related features for an extended amount of time after the mobile device 102 has transitioned from the normal operating mode. This lack of functionality can frustrate the user of the mobile device 102 who may only need a small amount of battery power for the mobile device 102 to energize a subsystem, which could be imperative to the user in certain circumstances. The embodiments discussed herein are set forth to resolve the aforementioned deficiencies.

Figure 2:
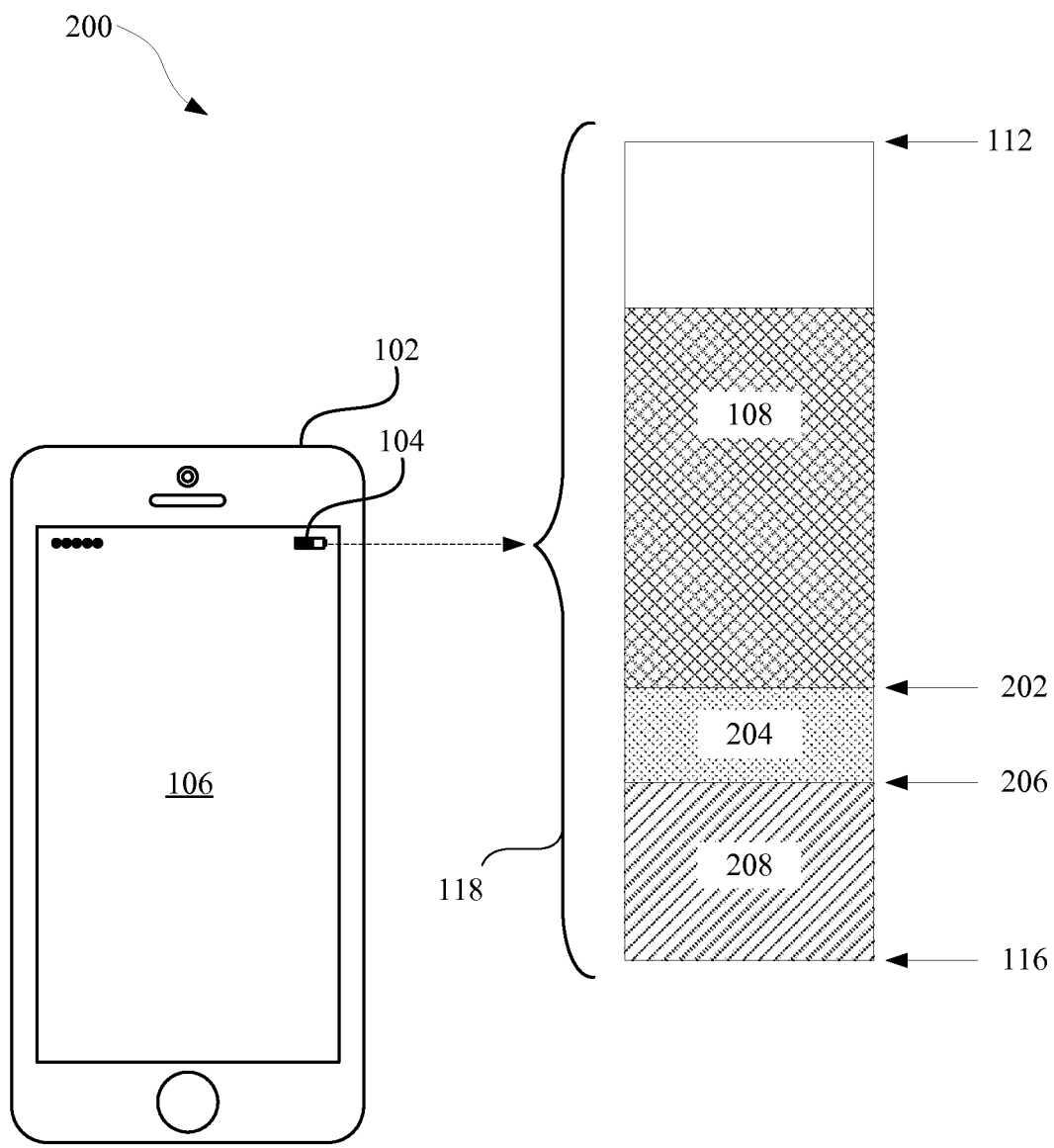
FIG. 2 illustrates a diagram of a mobile device and a battery chart detailing different battery state-of-charge thresholds, according to some embodiments discussed herein.

FIG. 2 illustrates a diagram 200 of a mobile device 102 having a battery status indicator 104 included at a user interface 106 of the mobile device 102, according to some embodiments discussed herein. Specifically, FIG. 2 sets forth a modified battery chart 118 for operating the mobile device 102 according to the various thresholds and charge levels provided in the battery chart 118. Similar to FIG. 1, the battery chart 118 includes a maximum charge level 112 that is indicative of when the battery of the mobile device 102 is at full capacity. The operating charge level 108 is provided for supplying power to the mobile device 102 during normal operations of the mobile device 102, as further described herein. In some embodiments of the mobile device 102 or subsystem of the mobile device 102, the battery chart 118 includes a wallet mode threshold 202. The wallet mode threshold 202 defines a level of battery charge when certain subsystems of the mobile device 102 can be shut down or otherwise be denied power, while other subsystems can be supplied a limited amount of power or current. The other subsystems provided limited current can include a payment transaction system and any suitable subsystem related to the operation of the payment transaction system, as further discussed herein. Upon entry into a wallet mode, the mobile device 102 can provide the user with a means for conducting payment transactions with a variety of persons, businesses, or any other target for accepting payment through a computing device. For example, the payment transaction system could use a keypad or fingerprint scanner that is displayed on the user interface of the mobile device 102 in order to accomplish secure transactions while in the wallet mode.

The wallet mode includes a reserved amount of battery charge indicated by the wallet mode charge level 204. The wallet mode charge level 204 and wallet mode threshold 202 can be static in some embodiments, and dynamic or adaptive in other embodiments. For example, the wallet mode threshold 202 can be set by a manufacturer of the mobile device 102 to be unchanged throughout the entire period of ownership of the mobile device 102. Alternatively, the wallet mode threshold 202 can be dynamic or adaptive, such that the system can set the wallet mode threshold 202 to be larger or smaller. Moreover, the wallet mode threshold 202 can use a predictive engine of the mobile device 102 to determine how often the user conducts payment transactions, and thereafter increase the wallet mode threshold 202 if the user begins to use payment transactions more, or decrease the wallet mode threshold 202 if the user begins to use the payment transactions less.

A wallet off threshold 206 is provided in some embodiments. The wallet off threshold 206 can be a point when the battery charge reserved for the wallet mode has been depleted. Upon the remaining battery charge reaching the wallet off threshold 206, the battery can be limited to only providing current to subsystems of the mobile device 102 that can assist the mobile device 102 during startup. The remaining charge below the wallet off threshold 206 is the wallet off charge level 208. In this way, the battery charge can avoid reaching the under-voltage lockout threshold 116, as discussed herein. In some embodiments, the mobile device 102 can be used as a passive transaction device regardless of the level of charge in the battery of the mobile device 102 (e.g., when the battery charge is below the wallet off charge level 208 or reaches the under-voltage lockout threshold 116). While being used as a passive transaction device, one or more of the subsystems of the mobile device 102 can be powered by an external electromagnetic field or carrier field that is associated with a person, business, or system that the user is providing a payment to. For example, the user could be at a public subway station, bus station, or any other suitable transportation facility that uses passive transaction cards in order to provide a person with access to the respective mode of transportation. By placing the mobile device 102 near a carrier field source at a transportation facility, the mobile device 102 can be provided power for the subsystems responsible for passive transactions and thereafter conduct a payment transaction, allowing the user to access the transportation provided.

Figure 3:
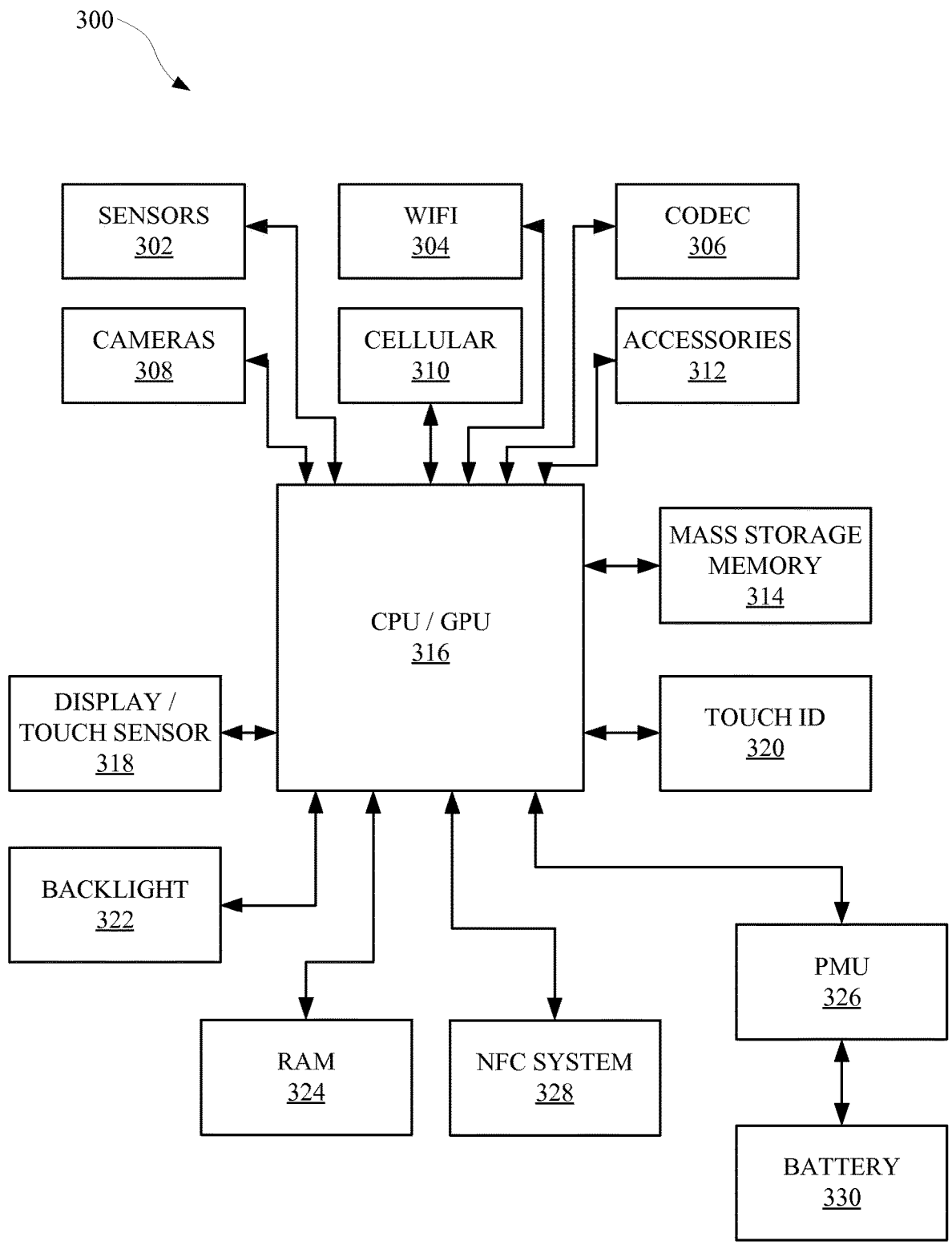
FIG. 3 illustrates a system diagram for the mobile device according to some embodiments discussed herein.

FIG. 3 illustrates a system diagram 300 for the mobile device 102 according to some embodiments discussed herein. Specifically, FIG. 3 illustrates the various subsystems and devices of the mobile device 102 that can be supplied full power, limited power, or no power depending on the mode the mobile device 102 is operating in, or amount of battery charge that is left in the battery of the mobile device 102. The mobile device 102 can include more or less subsystems than what is set forth in FIG. 3, according to some embodiments. Some subsystems of the mobile device 102 can include various sensors 302, a WIFI source 304, audio codecs 306, cameras 308, a cellular source 310, various accessories 312, a mass storage memory 314, and a random access memory (RAM) 324. A touch identification (ID) system 320 is provided in order to verify the fingerprint of a user of the mobile device 102. A backlight 322 is provided to illuminate the display/touch sensor 318 of the mobile device 102. A near field communication (NFC) system 328 is provided in communication with a power management unit (PMU) 326 and battery 330. The PMU 326 is configured to control the current or power provided from the battery to the various accessories and subsystems of the mobile device 102, including the NFC system 328.

During the normal mode and wallet mode of the mobile device 102, the PMU 326 can allow the battery to supply the NFC system 328 with a low current in order to create an electromagnetic field at the NFC system 328, which can be used to detect a payment or target system, as further discussed herein. Additionally, during the normal mode and wallet mode of the mobile device 102, the PMU 326 can allow the central processing unit (CPU) 316 and graphics processing unit (GPU) 316 to receive current from the battery 330 in order to enable various features of the user interface 106, as further discussed herein.

Figure 4:
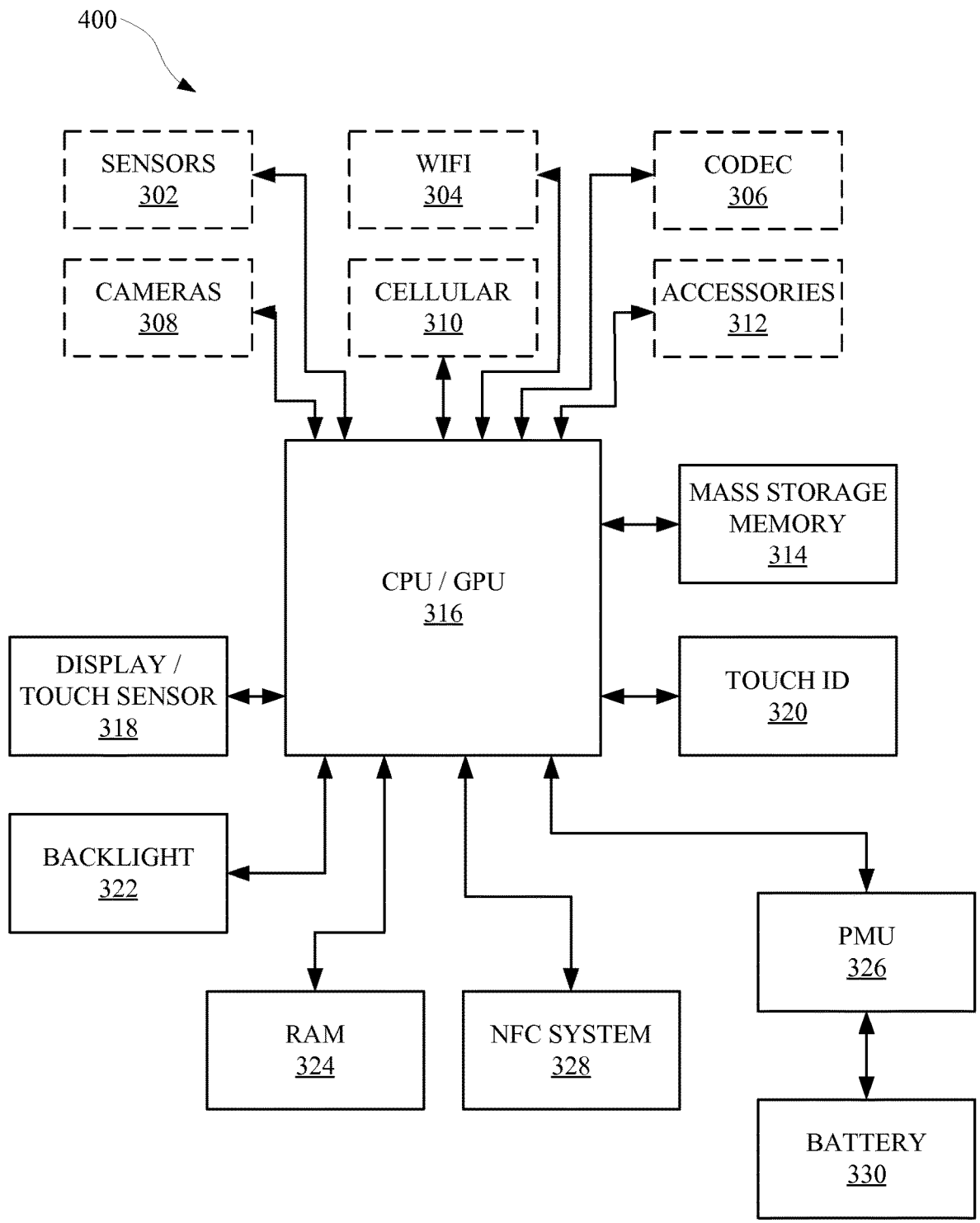
FIG. 4 illustrates a system diagram for the mobile device during a low power wallet mode of the mobile device, according to some embodiments discussed herein.

FIG. 4 illustrates a system diagram 400 for the mobile device 102 during the wallet mode of the mobile device 102, according to some embodiments discussed herein. Specifically, FIG. 4 illustrates the subsystems that can be restricted from receiving current from the battery 330 during the wallet mode, as indicated by the dotted lines surrounding such subsystems. In some embodiments the sensors 302, WIFI source 304, audio codecs 306, cameras 308, cellular source 310, and accessories 312 can be restricted from receiving any power during the wallet mode. In this way, the charge level of the battery can be reserved for performing multiple payment transactions over an extended period of time (e.g., multiple hours or days). The subsystems that can be designated for conducting payment transactions include the mass storage memory 314, CPU/GPU 316, display/touch sensor 318, touch ID system 320, backlight 322, RAM 324, NFC system 328, PMU 326, and battery 330. Additionally, when the mobile device 102 is being used as a passive transaction device, the subsystems that can be designated for conducting payment transactions can include the NFC system 328, CPU 316, and the mass storage memory 314.

Figure 5:
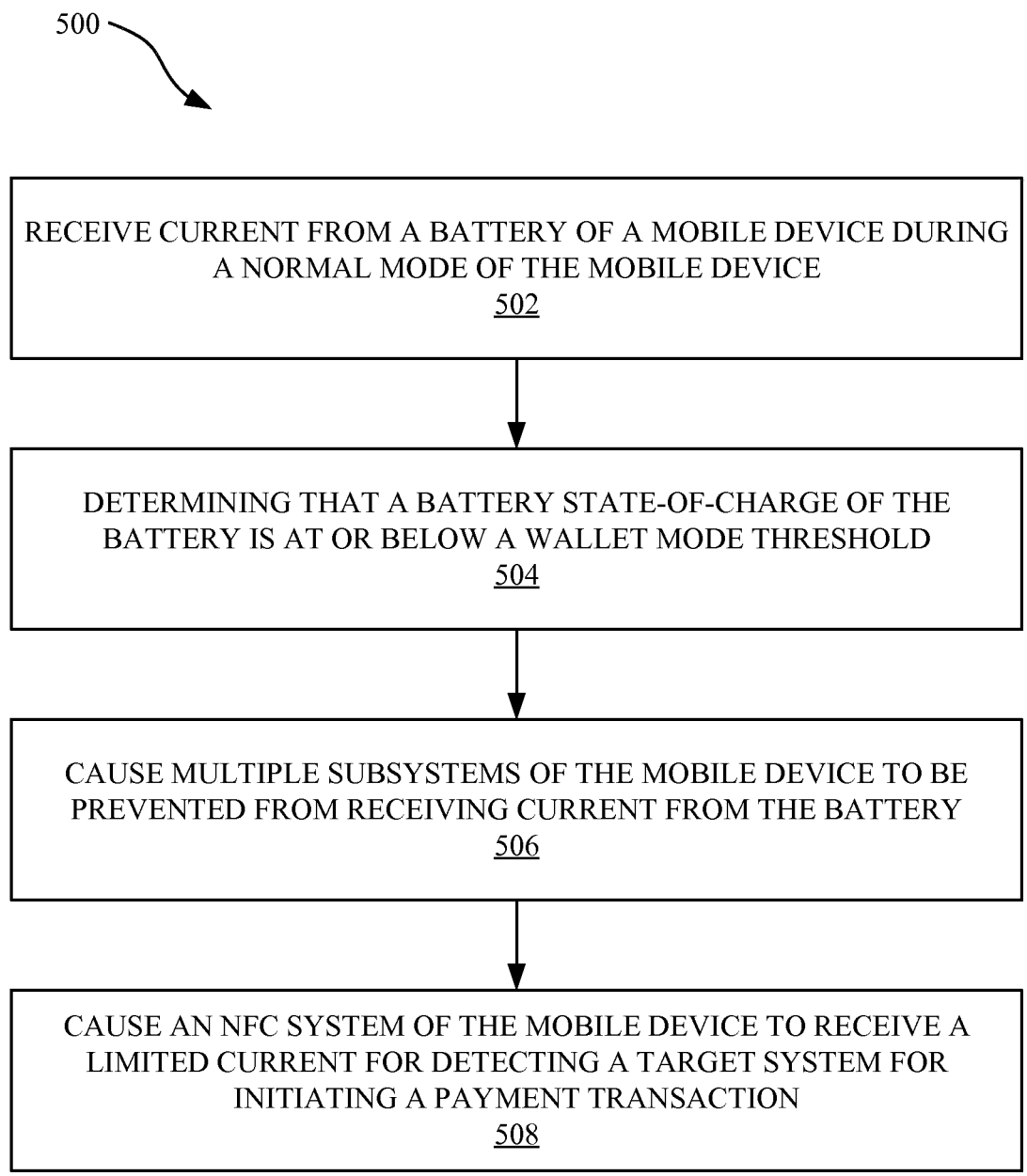
FIG. 5 illustrates a method for shutting down various subsystems of the mobile device and supplying a limited current to an NFC system, according to some embodiments discussed herein.

FIG. 5 illustrates a method 500 for shutting down various subsystems of the mobile device 102 and supplying limited current to the NFC system 328, according to some embodiments discussed herein. Specifically, the method 500 includes steps for transitioning, by a CPU 316, the mobile device 102 into a wallet off mode. The method 500 includes a step 502 wherein the CPU 316 receives current from the battery 330 of the mobile device 102 during a normal mode of the mobile device 102. At step 504, the CPU 316 determines that the battery 330 of the mobile device 102 is at or below a wallet mode threshold 202. At step 506, the CPU causes multiple subsystems of the mobile device 102 to be prevented from receiving current from the battery 330. Furthermore, at step 508, the CPU causes the NFC system 328 of the mobile device 102 to receive a limited current for detecting a target system capable of initiating a payment transaction.

Figure 6:
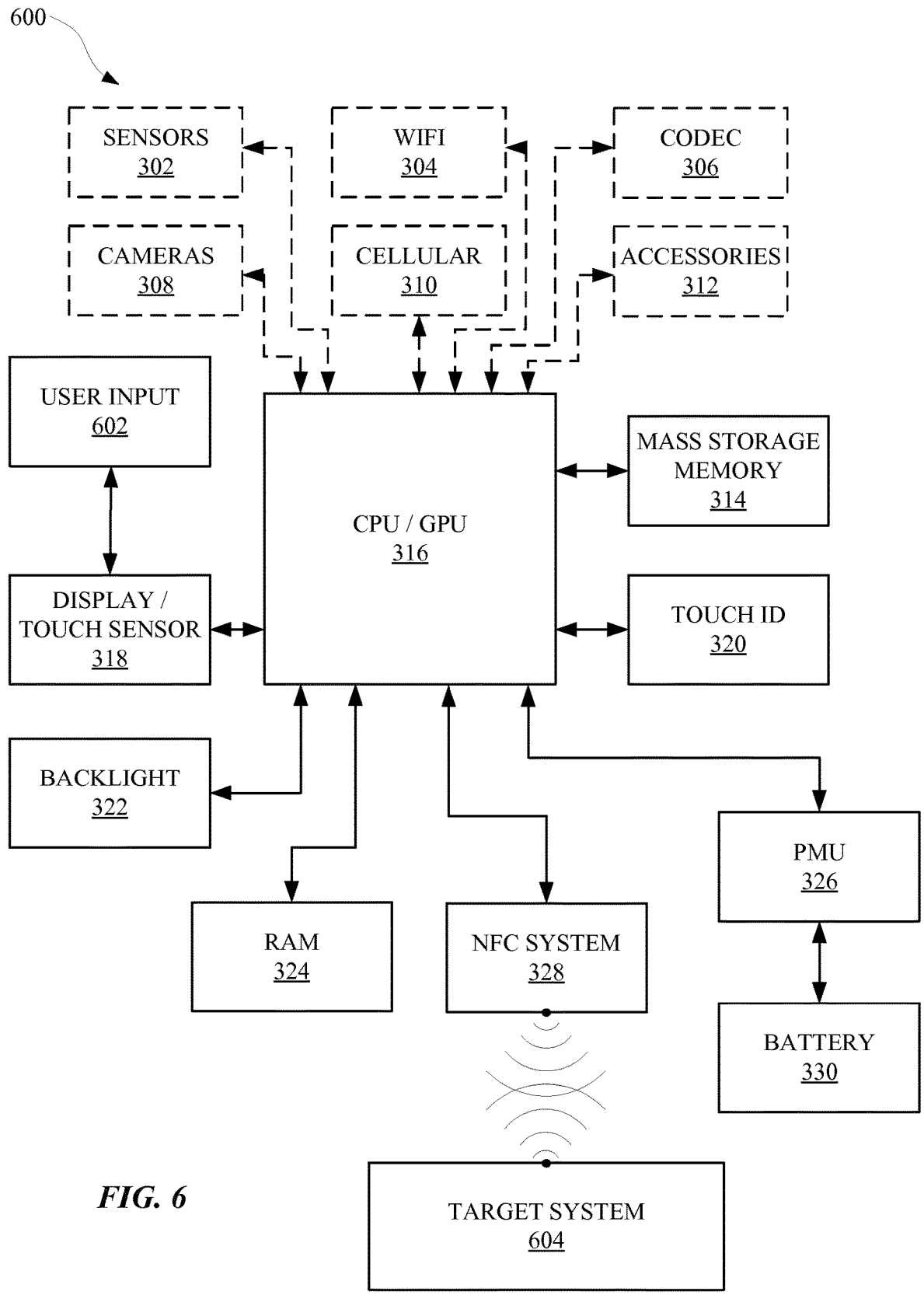
FIG. 6 illustrates the subsystems of the mobile device that can operate during a low power wallet mode.

FIG. 6 illustrates a diagram 600 of the subsystems of the mobile device 102 that can operate during a wallet off mode. During the wallet off mode, the NFC system 328 can receive a small amount of current from the battery 330 in order to operate a field detection circuit of the NFC system 328. The field detection circuit operates to detect any electromagnetic field proximate to the mobile device 102. The field detection circuit can determine the existence of an electromagnetic field using an inductor that can detect a change in an existing magnetic field, an electromagnetic field causing an energy level above a predetermined threshold, or any suitable indication for the existence of an electromagnetic field. In some embodiments, the field detection circuit of the NFC system 328 can detect an electromagnetic field of a target system 604, as illustrated in FIG. 6. Upon detecting the electromagnetic field of the target system 604, an initiating signal can be sent to the PMU 326 to allow the battery 330 to provide additional current to the NFC system 328 and other subsystems illustrated in FIG. 6. For example, when the user of the mobile device 102 is conducting a payment transaction at the target system 604, the target system 604 can prompt the user for a user input 602 such as a fingerprint, a password, a retina scan, speech verification, or any other suitable user identification for verifying a payment transaction. The user input 602 can be provided to the display/touch sensor 318, or any other suitable input device, during the wallet mode, where the display/touch sensor 318 and backlight 322 receive a limited amount of current during a short duration of the payment transaction, as further discussed herein. The user input 602 can be converted into an electromagnetic signal, which can be transmitted to the target system 604 through the NFC system 328 in order to verify an identity of the user during the payment transaction. The conversion of the user input 602 can be performed by a combination of one or more subsystems of the mobile device 102, including the mass storage memory 314, touch ID system 320, RAM 324, CPU/GPU 316, PMU 326, the NFC system 328, or any other suitable subsystem for verifying the identification of a user.

Figure 7:
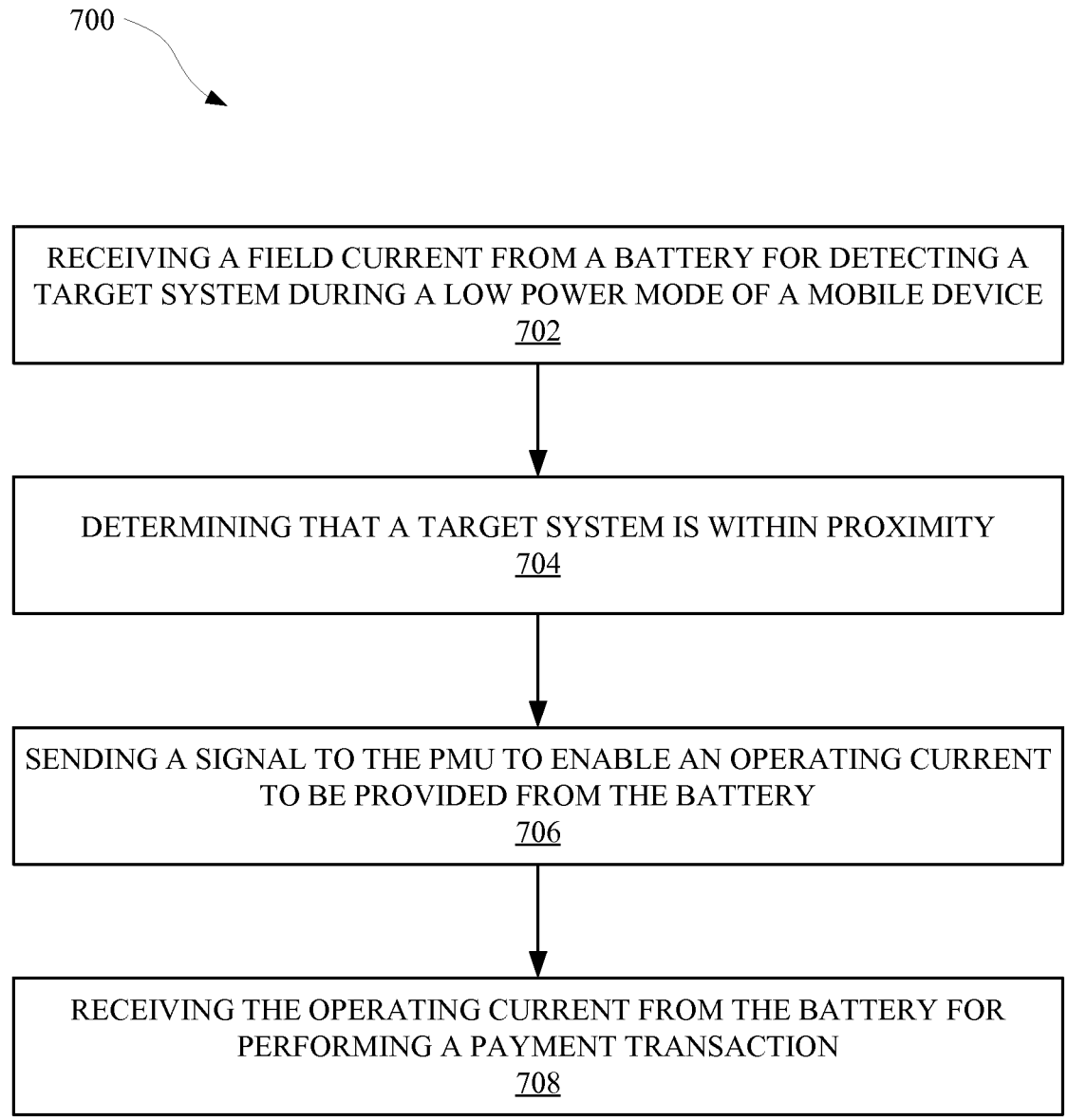
FIG. 7 illustrates a method for initiating a payment transaction using the NFC system, according to some embodiments discussed herein.

FIG. 7 illustrates a method 700 for initiating a payment transaction using the NFC system 328. The method 700 includes a step 702 of receiving, at the NFC system 328, a field current from a battery 330 for detecting a target system 604 during a wallet mode of the mobile device 102. The field current can be any suitable level of current for creating an electromagnetic field (EMF) at an antenna, inductor, or other EMF device that can receive or detect EMF's. At step 704, the NFC system 328 can determine that a target system is within proximity of the NFC system 328. Proximity refers to the distance between the NFC system 328 or mobile device 102, and a target system 604. The proximity can vary depending on the type of target system 604 that is being used to conduct the payment transaction. At step 706, the NFC system 328 sends a signal to the PMU 326 to enable an operating current to be provided form the battery 330. The operating current can be provided in order to carry out payment transactions between the NFC system 328 and the target system 604, including the exchange of user validation data and account information associated with the source of payment. At step 708, the NFC system 328 can receive the operating current from the battery 330 for performing the payment transaction.

Figure 8:
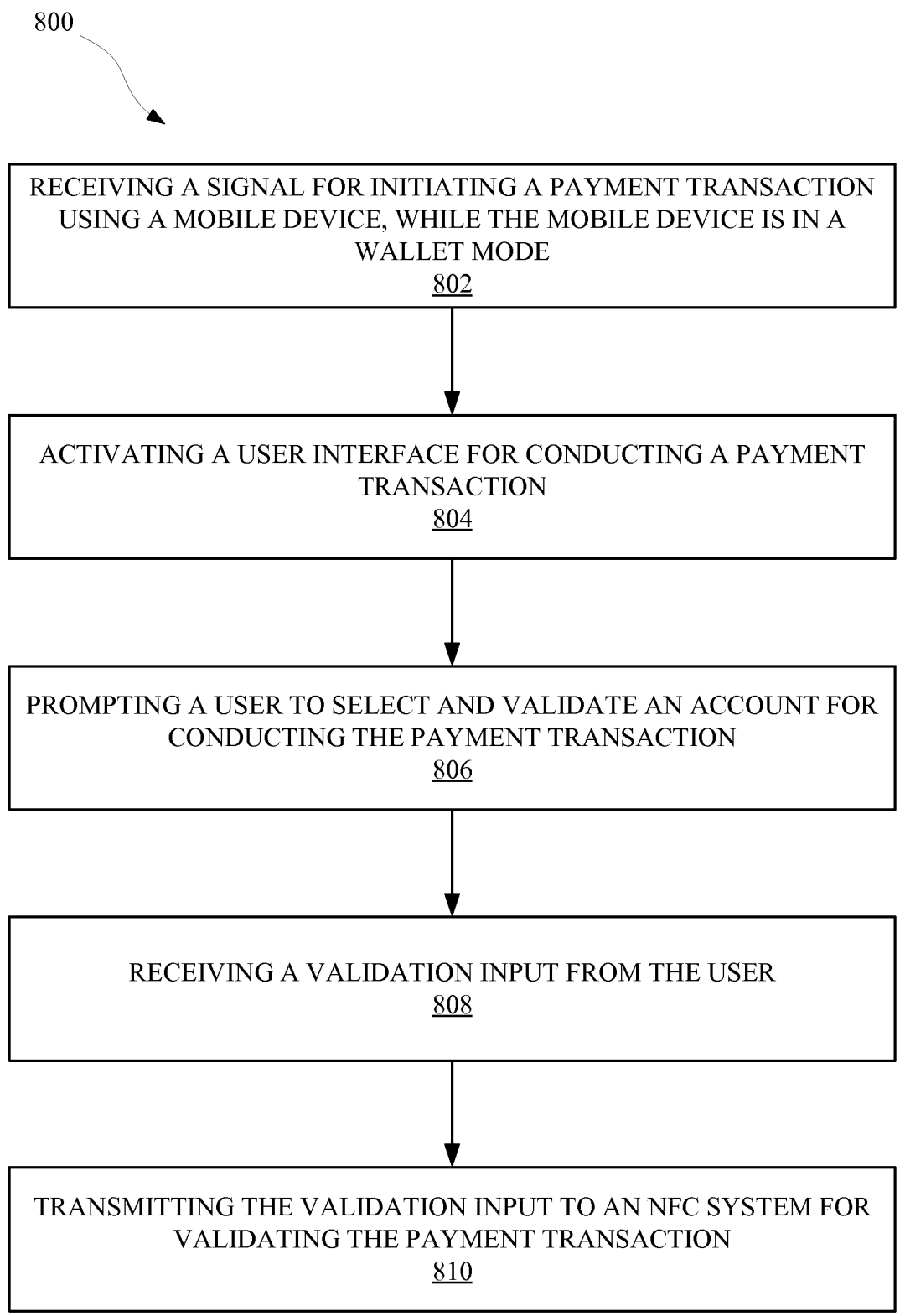
FIG. 8 illustrates a method for validating a payment transaction using the mobile device, while the mobile device is in the low power wallet mode.

FIG. 8 illustrates a method 800 for validating a payment transaction using the mobile device 102, while the mobile device 102 is in the wallet mode. The method 800 includes a step 802, wherein the CPU of the mobile device 102 receives a signal for initiating a payment transaction, while the mobile device 102 is in a wallet mode. The signal can be sent from the PMU 326, NFC system 328, or any other suitable subsystem for initiating a payment transaction. At step 804, the CPU 316 can activate a user interface for conducting a payment transaction. Activating the user interface can include turning on the backlight 322 to a low power state (e.g., 50% normal operating power), activating a touch ID system 320, and/or displaying a keypad at the display/touch sensor 318. In this way, the touch ID system 320 can be used to validate a fingerprint of the user, and/or the keypad at the display/touch sensor 318 can be used to allow the user to input a password or other code to validate a payment transaction. At step 806, the CPU 316 can prompt the user to select and validate an account for conducting the payment transaction. Multiple payment accounts can be stored at the mass storage memory 314 of the mobile device 102, and each payment account can be displayed for the user to select prior to making a payment. For example, the user can store a payment account for a private cab company and a payment account for a public subway. When the user reaches a target system 604 associated with the public subway, the CPU 316 can present, at the user interface 106 of the mobile device 102, a list including both the private cab company account and the public subway account. The user can then select the public subway account in order to continue the payment transaction process accordingly. At step 808, the CPU 316 can receive a validation input from the user. As discussed herein, the validation input can be input through a variety of mediums and contain a variety of data not limited to fingerprint information, passwords, retina data, facial recognition, speech recognition, or any other suitable information for validating an account. At step 810, the CPU 316 can transmit the validation input to the NFC system 328 for validating the payment transaction with the target system 604. The target system 604 can verify the validation input locally, or at a network device that can match the validation input with account information stored at the network device.

Figure 9:
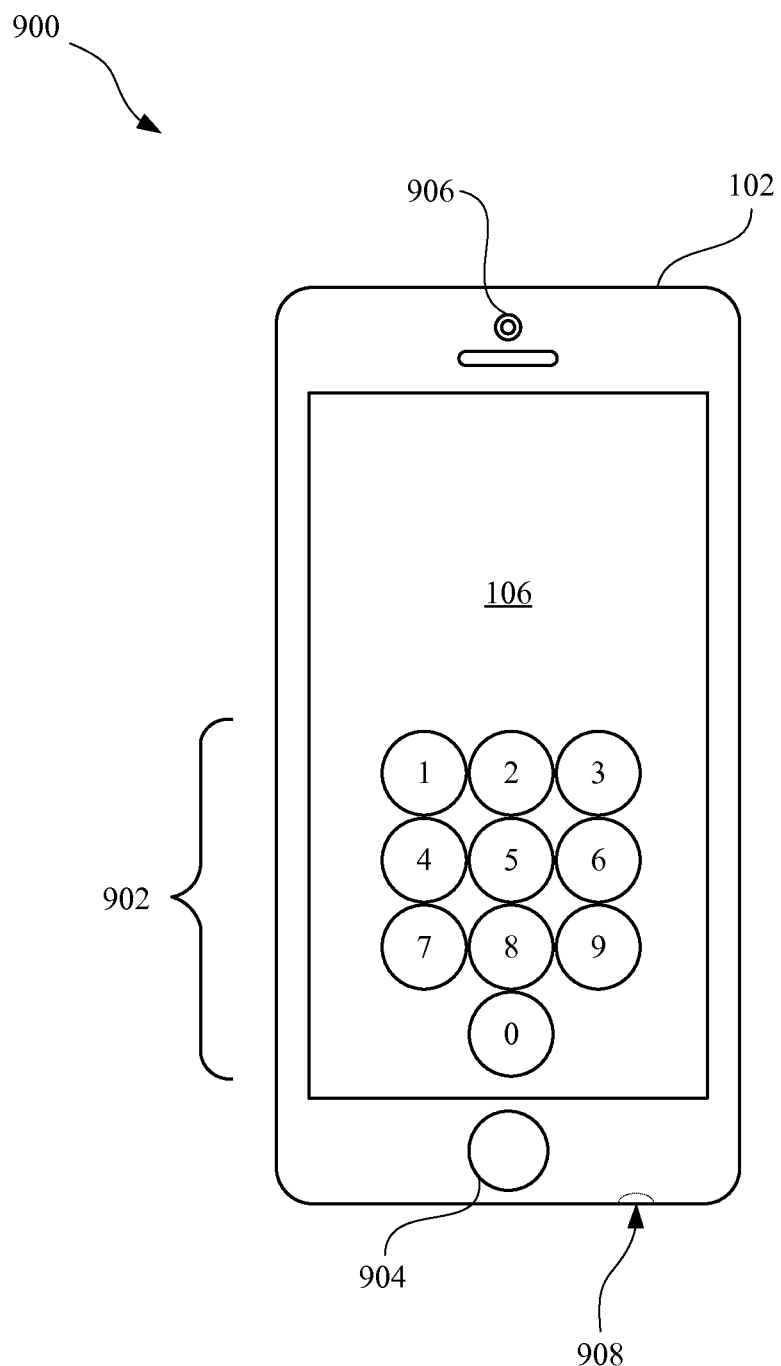
FIG. 9 illustrates a diagram of the mobile device having multiple means for validating a payment transaction, according to some embodiments discussed herein.

FIG. 9 illustrates a diagram 900 of the mobile device 102 having multiple means for validating a payment transaction. In particular, FIG. 9 details the subsystems of the mobile device 102 that can be provided a low current during the wallet mode in order to validate a payment transaction. The mobile device 102 can include a keypad 902 that is displayed on the user interface 106 of the mobile device 102. In some embodiments, the keypad 902 can display numbers, letters, and/or any other characters suitable for entering a validation input. The mobile device 102 can also include a fingerprint scanner 904 for scanning the fingerprint of the user in order to obtain a validation input. The fingerprint scanner can include an imaging device, or any other suitable device for reading the fingerprint of a person. The mobile device 102 can also include a camera 906 for performing various validation functions not limited to facial recognition, retina scanning, or any other suitable validation function. In some embodiments, the camera 906 can be provided little or no current, depending on the validation method being used, during the wallet mode in order to conserve power during the wallet mode. The mobile device 102 can also include a microphone 908 for performing various validation functions such as voice recognition, in some embodiments. In this way, a person can speak into the microphone 908 in order to validate a payment transaction. Each of these subsystems can be used alone or in combination in order to validate a payment transaction.

Figure 10:
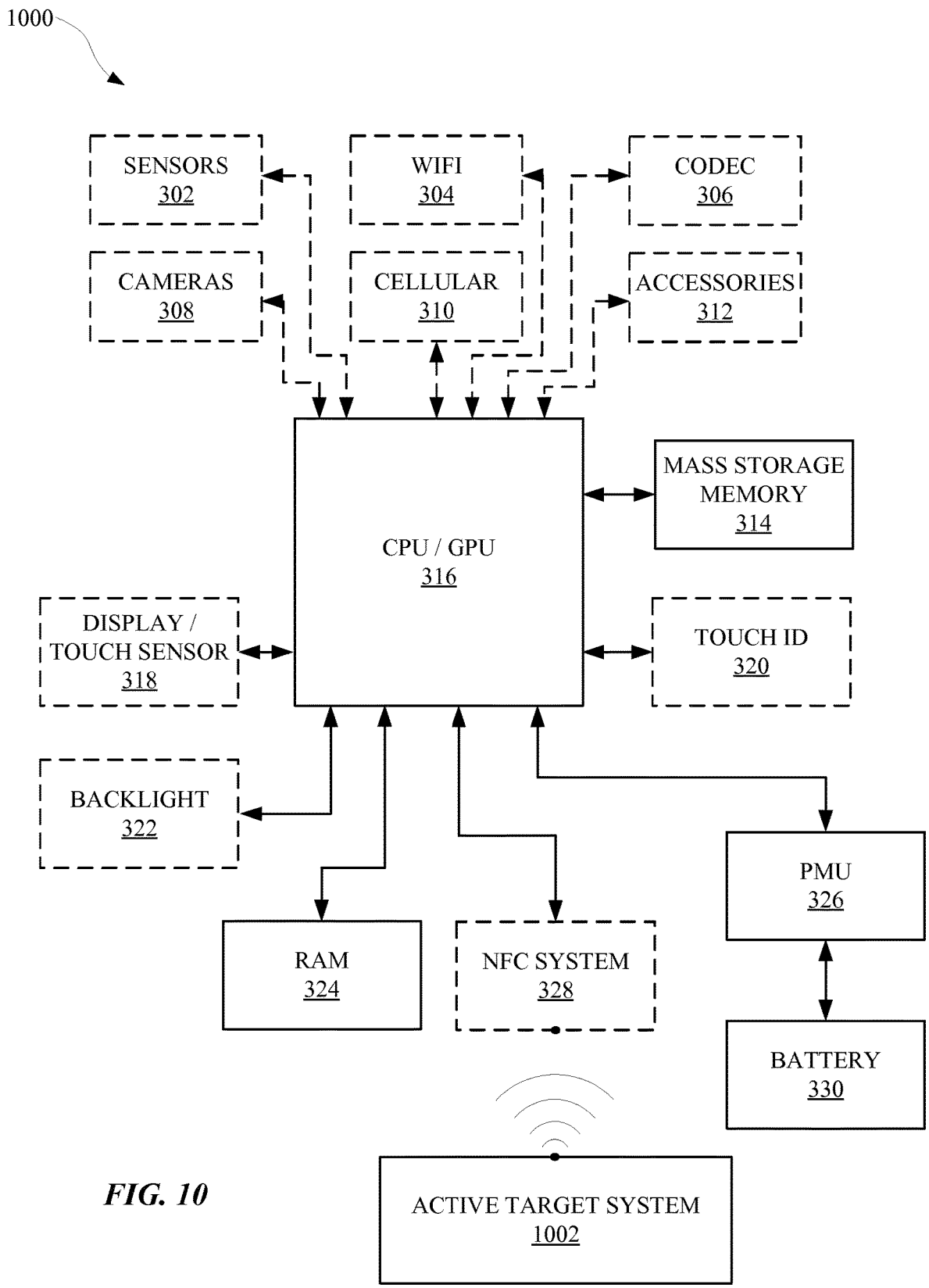
FIG. 10 illustrates a diagram of the various subsystems that can be utilized to conduct a payment transaction during the lower power wallet mode of the mobile device.

FIG. 10 illustrates a diagram 1000 of the various subsystems that can be utilized to conduct a payment transaction during the wallet off mode of the mobile device 102. Upon the battery 330 having a charge that is at or below the wallet off threshold 206, the mobile device 102 can transition into a passive transaction device rather than a phone, in some embodiments. In this way, the mobile device 102 would not be able to place calls, send messages, or perform any communication related tasks not associated with conducting passive transactions. During the wallet off mode, the battery 330 can supply low current to the PMU 326, CPU/GPU 316, RAM 324, and/or mass storage memory 314 according to some embodiments. The NFC system 328 can be prevented from receiving any current during the wallet off mode, but can still be used accomplish passive transactions. Passive refers to the ability of the NFC system 328 to perform payment transactions without requiring any power source in the mobile device 102 to supply current to the NFC system 328. When the NFC system 328 is placed in proximity to the active target system 1002, the active target system 1002 can supply an EMF to the NFC system 328. The EMF response from the NFC system 328 can be decoded by the active target system 1002 in order to obtain account related data from the NFC system 328. Using the account related data, the active target system 1002 can deduct a payment from the account of the user. In this way, the user is able to make a passive transaction at a point when the mobile device 102 is not operating as a phone. For example, when the battery of a person's phone does not have enough charge to place calls, the person can still pay for a transit pass to help them get to a destination if they are stranded somewhere.

Figure 11:
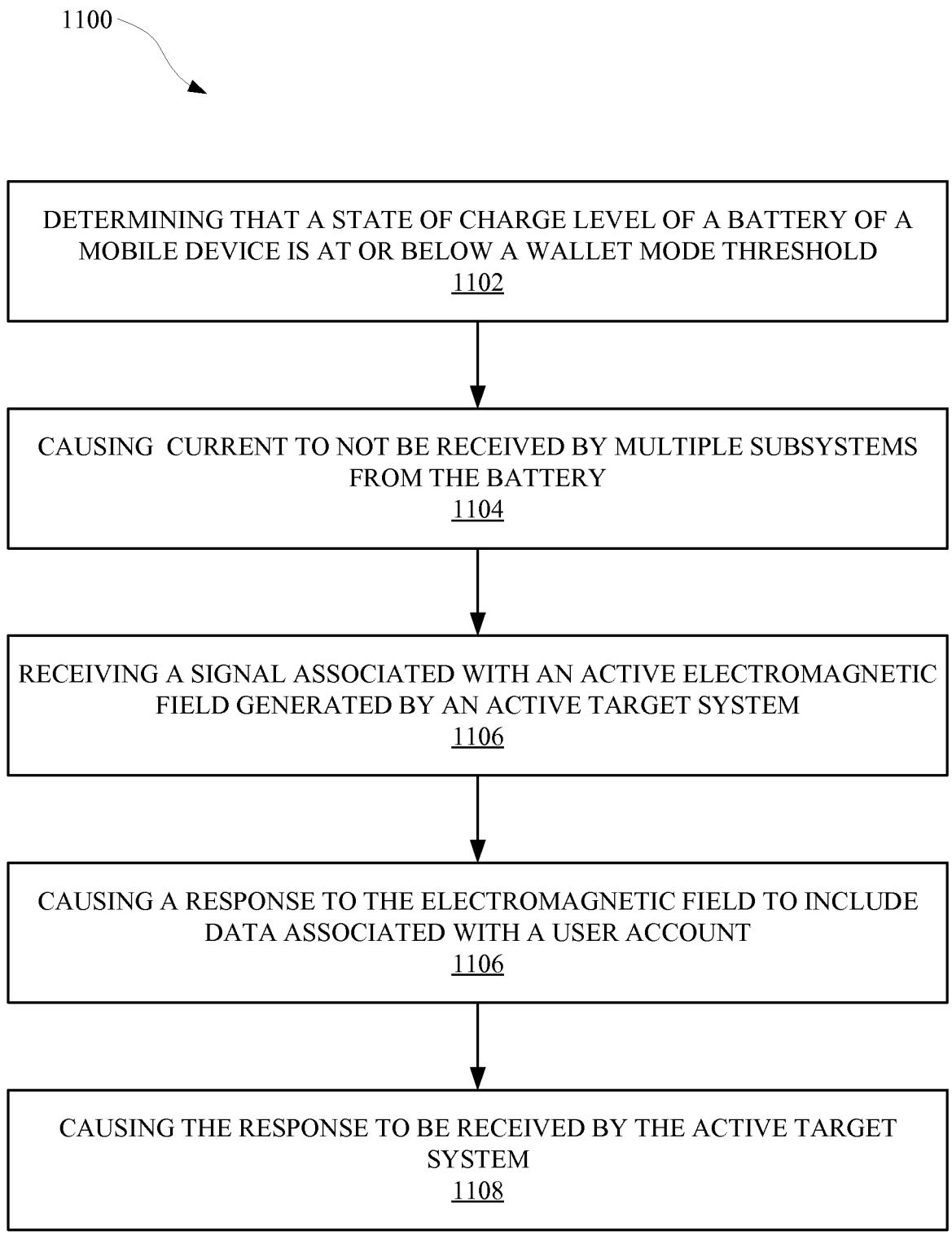
FIG. 11 illustrates a method for conducting a payment transaction using the NFC system after the mobile device transitions into a passive transaction device.

FIG. 11 illustrates a method 1100 for conducting a payment transaction using the NFC system 328 after the mobile device 102 transitions into a passive transaction device. The method 1100 includes a step 1102 in which the CPU 316 determines that the charge level of a battery 330 of the mobile device 102 is at or below the wallet off threshold 206.

At step 1104, the CPU 316 causes current to not be received by multiple subsystems from the battery. In this way, the mobile device 102 begins to act as a passive transaction device. At step 1106, the method 1100 includes, at the CPU 316, receiving a signal associated with an active electromagnetic field generated by the active target system 1002. At step 1106, the CPU 316 causes a response to the EMF to include data associated with the user account. The data can be included in the EMF such that a filtering process, or other means of analyzing EMF's, can be used to derive the data from the EMF. At step 1108, the CPU 316 causes the response to be received by the active target system 1002, which can thereafter filter the data from the EMF in order to finalize a transaction such as a payment.

Figure 12:
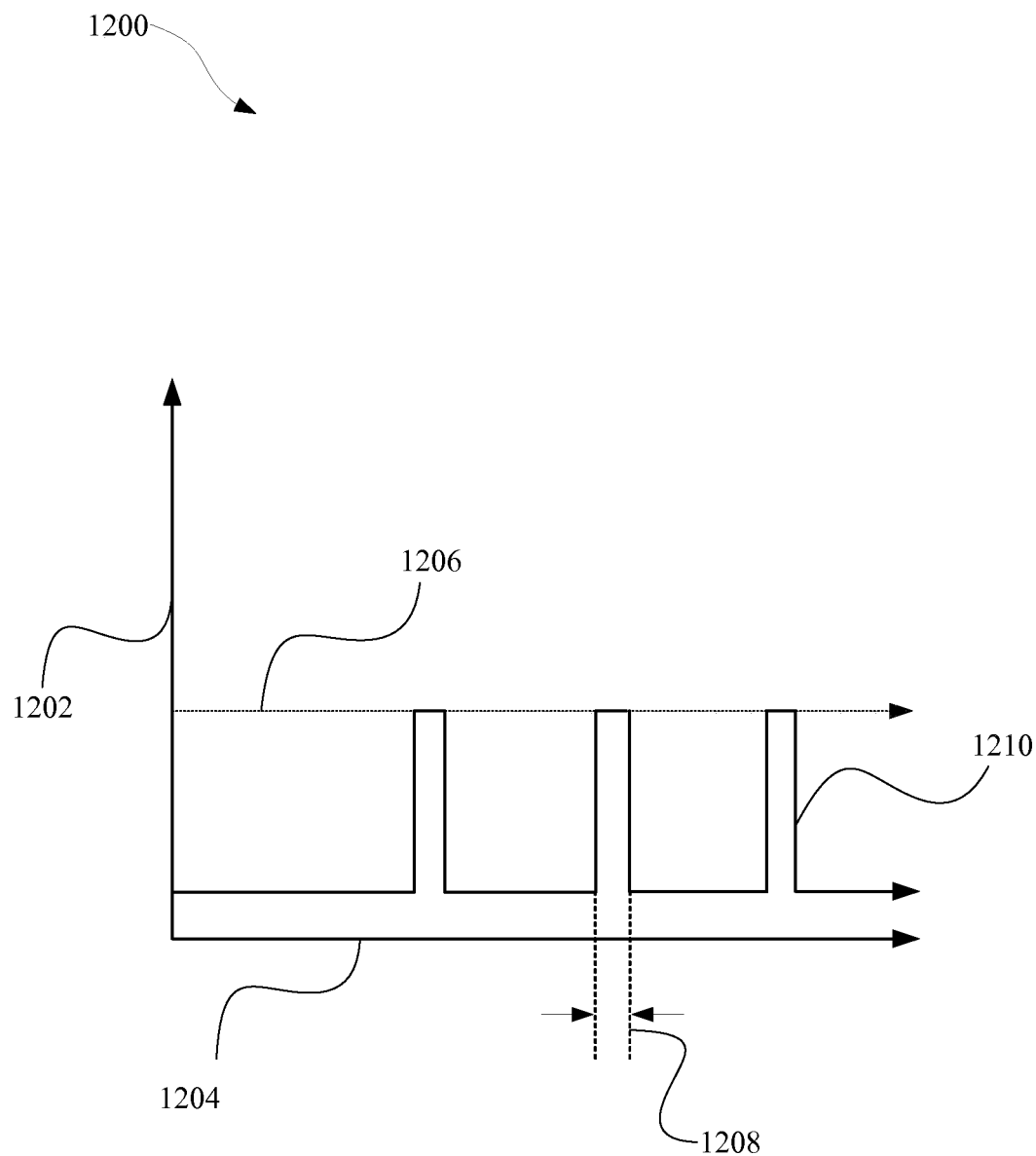
FIG. 12 illustrates a plot of the duty cycle of payment transactions occurring during the low power wallet mode of the mobile device.

FIG. 12 illustrates a plot 1200 of the duty cycle 1208 of payment transactions 1210 occurring during the wallet mode of the mobile device 102. Specifically, FIG. 12 illustrates how the duty cycle 1208 has a limited period in order preserve battery charge during the wallet mode and, thereby maximizing the number of payment transactions 1210 that can be made during the wallet mode. The plot 1200 includes a current axis 1202 and a time axis 1204 in order to show how current changes over time. A peak level 1206 is provided in order to limit the amount of current provided to the NFC system 328 during a payment transaction 1210. For example, when the NFC system 328 detects a target system 604, an operating current can be provided to the NFC system 328 and other subsystems of the mobile device 102. The operating current can cause the spike in current during the payment transaction 1210. However, by using the peak level 1206 and limiting the duty cycle 1208, the effect on battery charge level caused by the spike can be limited. The number of payment transactions that can be accomplished during the wallet mode can be set or approximately set by modifying the duty cycle 1208 and peak level 1206. For example, by decreasing the period of the duty cycle 1208 and decreasing the peak level 1206, less power would be consumed during each payment transaction 1210 and thus more payment transactions 1210 would be possible over the same amount of time. The peak level 1206 can apply to the whole mobile device 102, thereby mitigating current spikes overall systems and subsystems of the mobile device 102. The peak level 1206 can be sustained by turning off various subsystems such as cellular source 310 and WIFI source 304, and controlling the throttling of other subsystems to deliver only the minimum performance required to conduct a payment transaction (e.g., backlight 322, CPU/GPU 316, and any other suitable subsystems discussed herein). Furthermore, some subsystems can be left unmodified in order to allow the subsystems to continue to run regardless of current drawn. Such systems that can be left unmodified can include the NFC system 328, RAM 324, and any other suitable subsystem that will adversely affect the mobile device 102 during a low power wallet mode, or cause the battery 330 to fall below the wallet off threshold 206. In this way, by limiting the current provided to various systems and subsystems, better performance during wallet mode can be obtained in order to more readily conduct payment transactions in a way that optimizes the user experience.

Figure 13A:
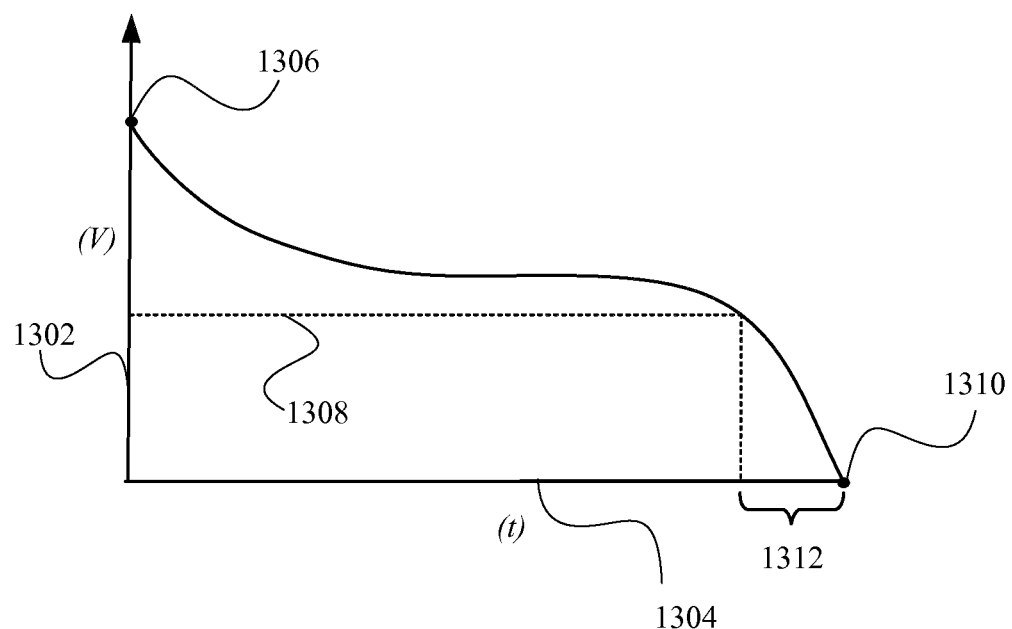
FIGS. 13A-13B illustrate plots of voltage with respect to discharge time of the battery of the mobile device.
Figure 13B:
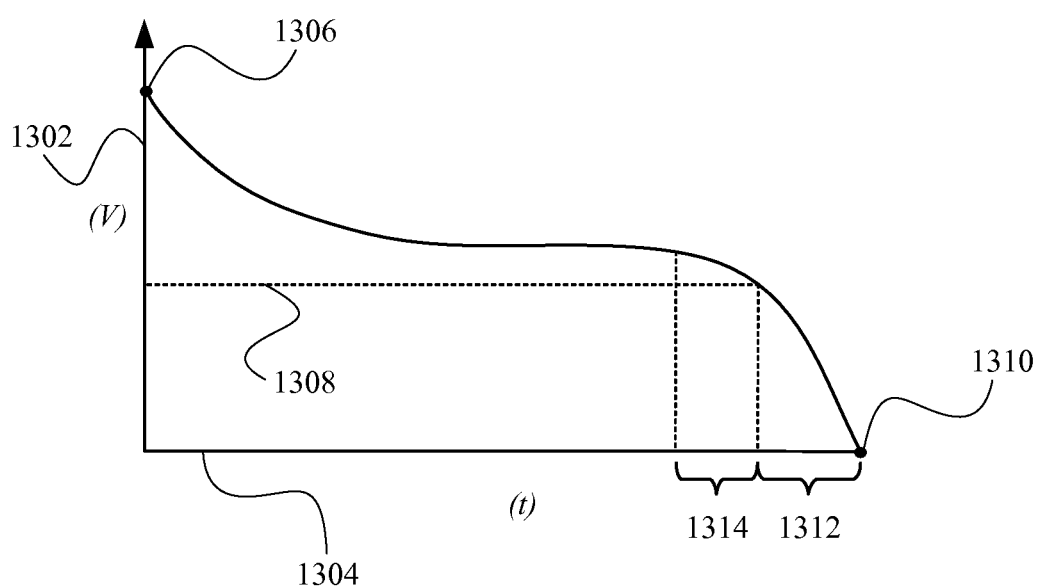

FIGS. 13A-13B illustrate plots of voltage 1302 with respect to discharge time 1304 for the battery 330 of the mobile device 102. Specifically, FIGS. 13A-13B set forth plots of voltage 1302 of the battery 330 with respect to discharge time 1304, wherein the battery 330 has a peak voltage and full capacity (100%) at point 1306, and an under-voltage lockout threshold at point 1310. According to FIG. 13A, a normal off threshold 1308 is provided so that the PMU 326 can limit the current from the battery 330 when the operating charge level 108 or voltage level reaches the normal off threshold 1308. A normal off capacity 1312, corresponding to the normal off charge level 110 discussed herein, is then left in order to provide a buffer region above the under-voltage lockout threshold, point 1310, to handle any peak voltages and spikes. However, according to some embodiments and as set forth in FIG. 13B, a wallet mode capacity 1314, corresponding to the wallet mode charge level 204 discussed herein, is reserved in order to provide a low current from the battery 330 during the wallet mode of the mobile device 102. As illustrated in FIG. 13B, the wallet mode capacity 1314 is provided prior to the battery 330 reaching the normal off threshold 1308 and the normal off capacity 1312. In some embodiments, a percentage of capacity reserved for the wallet mode can be equal to, less than, or greater than the percentage of capacity reserved for the normal off mode. Additionally, the values for normal off capacity 1312 and wallet mode capacity 1314 can be static, or dynamic in order to adapt to the preferences or trends of usage for the user of the mobile device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computing device comprising:
multiple subsystems; and
a field detector, wherein the computing device is configured to:
determine that a charge of a battery of the computing device is at or below a predetermined threshold, wherein the predetermined threshold is set below a minimum battery charge value for executing an operating system of the computing device; and
in response to the determination:
prevent the multiple subsystems from receiving power from the battery;
provide a first power signal from the battery to the field detector; and
when the field detector indicates that a target system is at a sufficient distance to communicate with the field detector:
cause a payment system of the computing device to provide an initiation signal to a power management system of the computing device, wherein the power management system causes a second power signal, that is greater than the first power signal, to be supplied to the field detector for conducting a payment transaction.

2. The computing device of claim 1, further comprising a user interface, wherein:
when the field detector is provided with the first power signal, the computing device is further configured to detect the target system using the field detector; and
when the target system is detected, the computing device is further configured to present a notification interface on the user interface.

3. The computing device of claim 1, further comprising a fingerprint scanner, wherein:
while a charge level of the battery is at or below a wallet mode threshold, the computing device is configured to validate an account using the fingerprint scanner; and
in response to a validation of the account, the computing device to conduct a payment transaction by the field detector.

4. The computing device of claim 1, wherein the computing device is further configured to:
determine that a charge level of the battery is at or below a wallet off threshold that is less than the predetermined threshold; and
in response to the determination that the charge level of the battery is at or below the wallet off threshold, operate the field detector as a passive transaction device.

5. The computing device of claim 1, wherein:
a subsystem of the multiple subsystems comprises a cellular subsystem for conducting telephone calls;
in response to the determination that the charge of the battery is at or below the predetermined threshold, the computing device is further configured to:
prevent the cellular subsystem from conducting telephone calls; and
detect a target system by the field detector; and
in response to the detection of the target system, the computing device is further configured to provide payment account data to the detected target system.

6. The computing device of claim 1, further comprising a touch sensor, wherein, in response to the determination that the charge of the battery is at or below the predetermined threshold, the computing device is further configured to:
activate the touch sensor; and
display a device status by the activated touch sensor.

7. The computing device of claim 1, wherein the computing device is further configured to:
determine that a charge level of the battery is at or below a wallet off threshold that is less than the predetermined threshold; and
in response to the determination that the charge level of the battery is at or below the wallet off threshold, prevent the field detector from receiving any current from the battery.

8. A non-transitory, computer-readable medium storing instructions that, when executed by one or more processors, cause the one or more processors to:
determine that a charge level of a battery of a device is at or below a wallet mode threshold; and in response to determining that the charge level of the battery is at or below the wallet mode threshold:
prevent multiple subsystems of the device from receiving a current from the battery; and
provide a near field communication (NFC) device of the device with a field operating current in order to operate a field detector of the NFC device.

9. The non-transitory, computer-readable medium of claim 8, wherein the instructions, when executed by the one or more processors, further cause the one or more processors to:
display, with a user interface of the device, a notification interface when the field detector has detected a target system and when the charge level of the battery is at or below the wallet mode threshold.

10. The non-transitory, computer readable medium of claim 8, wherein the instructions, when executed by the one or more processors, further cause the one or more processors to:
validate, with a fingerprint scanner a payment transaction conducted by the NFC device when the charge level of the battery is at or below the wallet mode threshold.

11. The non-transitory, computer-readable medium of claim 8, further comprising:
a wallet off threshold that is less than the wallet mode threshold, wherein, when the charge level of the battery is at or below the wallet off threshold, the NFC device is capable of operating as a passive transaction device.

12. The non-transitory, computer-readable medium of claim 8, wherein a subsystem of the multiple subsystems includes a cellular subsystem for conducting phone calls, and when the charge level of the battery is at or below the wallet mode threshold:
the cellular subsystem is prevented from conducting phone calls; and
the NFC device is capable of providing payment account data to a target system detected by the field detector.

13. The system non-transitory, computer-readable medium of claim 8, wherein the instructions, when executed by the one or more processors, further cause the one or more processors to:
cause a user interface to display an NFC device status when a touch sensor of the device is activated and the charge level of the battery is at or below the wallet mode threshold.

14. The non-transitory, computer-readable medium of claim 8, wherein the instructions, when executed by the one or more processors, further cause the one or more processors, when the charge level of the battery is at or below a wallet off threshold, to:
prevent the NFC device and the multiple subsystems from receiving the current from the battery.

15. A cellular device, comprising:
a memory; and
at least one processor configured to:
determine that a charge of a battery is at or below a low charge threshold; and
in response to the determination that the charge of the battery is at or below the low charge threshold:
prevent a network antenna from receiving current from the battery, and
provide a near field communication (NFC) system a field operating current for detecting a target system.

16. The cellular device of claim 15, wherein when the NFC system detects the target system, a transaction current, which is greater than the field operating current, is provided to the NFC system in order to conduct a payment transaction between the cellular device and the target system.

17. The cellular device of claim 15, further comprising:
a memory storing account data related to multiple payment accounts, wherein the NFC system is capable of transmitting at least a portion of the account data to the target system when the battery is at or below the low charge threshold.

18. The cellular device of claim 15, further comprising:
a fingerprint scanner, wherein fingerprint data is capable of being transmitting to the target system for validating a payment transaction when the battery is at or below the low charge threshold.

19. The cellular device of claim 15, further comprising:
a user interface configured to display a payment prompt related to a payment transaction between the target system and the NFC system when the battery is at or below the low charge threshold, wherein the payment prompt includes a list of one or more accounts for a user to choose as a source of funds for the payment transaction.

20. The cellular device of claim 15, wherein a transaction current provided to the NFC system is restricted to a peak value during a duty cycle of a payment transaction in order to enable the NFC system to conduct multiple payment transactions when the charge of the battery is at or below the low charge threshold.

* * * * *